US006973840B2

(12) United States Patent
Cushing

(10) Patent No.: US 6,973,840 B2
(45) Date of Patent: Dec. 13, 2005

(54) COMPREHENSIVE ELECTROMAGNETIC FLOWMETER

(76) Inventor: Vincent J. Cushing, 1001 Mastline Dr., Annapolis, MD (US) 21401

( * ) Notice: Subject to any disclaimer, the term of this patent is extended or adjusted under 35 U.S.C. 154(b) by 0 days.

(21) Appl. No.: 10/236,956

(22) Filed: Sep. 9, 2002

(65) Prior Publication Data

US 2003/0056602 A1 Mar. 27, 2003

Related U.S. Application Data

(63) Continuation-in-part of application No. 09/679,310, filed on Oct. 6, 2000, now abandoned.

(60) Provisional application No. 60/378,061, filed on May 16, 2002, provisional application No. 60/317,963, filed on Sep. 10, 2001, provisional application No. 60/317,458, filed on Sep. 7, 2001, provisional application No. 60/157,848, filed on Oct. 6, 1999.

(51) Int. Cl.[7] ................................................ G01F 1/58
(52) U.S. Cl. ................................ 73/861.17; 73/861.12

(58) Field of Search ........................ 73/861.17, 861.11, 73/861.16, 861.12, 861.15, 861.14, 861.13

(56) References Cited

U.S. PATENT DOCUMENTS 4,290,313 A * 9/1981 Appel et al. ............ 73/861.17
4,672,331 A * 6/1987 Cushing ................. 73/861.17
4,953,409 A * 9/1990 Marchewka et al. ..... 73/861.17
5,866,823 A * 2/1999 Scarpa ................... 73/861.16

* cited by examiner

*Primary Examiner*—Harshad Patel
(74) *Attorney, Agent, or Firm*—Sughrue Mion, PLLC

(57) ABSTRACT

An electromagnetic flowmeter works with insulating liquids, and includes circuitry for handle drifting zero-point offset and triboelectric noise occurring in turbulently flowing dielectrics. Two signal processing schemes are presented—using high frequency induction and low frequency induction, but instead of measuring total voltage, the processor senses total voltage differentials, smooths the differentials, then integrates (sums) them such that the three components of total voltage are articulated—and, importantly, the flow voltage component itself is measured.

19 Claims, 4 Drawing Sheets

COMPREHENSIVE ELECTROMAGNETIC FLOWMETER

This application is a continuation-in-part of U.S. application Ser. No. 09/679,310, filed on Oct. 6, 2000 now abandoned, and claims priority from U.S. Application Nos. 60/157,848 filed Oct. 6, 1999, 60/317,458 filed Sep. 7, 2001, 60/317,963 filed Sep. 10, 2001, and 60/378,061 filed May 16, 2002, all of which are incorporated herein by reference.

BACKGROUND OF THE INVENTION

The electromagnetic (EM) flowmeter is a fundamental flowmeter. Its basis is a Lorentz transformation: a magnetic induction B in a stationary frame of reference is observed in the moving frame to have the same value of B—but one also observes an electric field E equal to u×B, where u is the velocity of motion. The electric field E, which is the basis of the EM flowmeter, exists solely because of motion. It involves no constitutive parameters: no material properties, such as sound speed, electrical conductivity or permittivity, viscosity, or other. Hence, in principle, it can meter any stuff that can be blown, pumped or extruded through a pipe.

The instrument has no moving parts, is obstructionless, and is non-intrusive. It is linear—thus it correctly meters the average of pulsating flow, and it meters flow in either direction. The present state of the art instrument is limited to conductive fluids. For conductive fluids, a technical discussion of the EM flowmeter can be found in Shercliff, J. A., *The Theory Of Electromagnetic Flow Measurement*, Cambridge University Press, New York, 1962.

The EM flowmeter was first operated with insulating liquids in the 1960s (see: (1) Cushing, Vincent, Dean Reily and George Edmunds, "Development of an Electromagnetic Flowmeter for Cryogenic Fluids," Final Report under Contract NASw-381, NASA Lewis Research Center, May 15, 1964; (2) Cushing, Vincent, "Electromagnetic Flowmeter," Rev Sci Instr, 36, 1142 (1965); (3) (same author as (2)), "Electromagnetic Flowmeter," *FLOW* (Proc of May 1971 Flow Symposium) (Roger B Dowdell, ed.) Vol 1, Part 2, ISA, Pitts, (1974), p 723. To ameliorate triboelectric noise, a 1 KHz square wave induction was used. For a literal square wave dϕ/dt is theoretically a Dirac pulse; however, eddy currents in the magnet and nearby conductive materials (shielding, housing, . . . ) produce a decaying pulse aftereffect. The signal is sampled as late as possible each half cycle—to allow the aftereffect to decay. But with high frequency induction there is not enough time for the aftereffect to decay adequately; the residual dϕ/dt leaves a zero-point offset that has been unacceptable for commercial application.

FIG. 1 shows an established transducer design for the flowmeter (see cited references 1,2,3 plus (4) (same author as (3), "Comprehensive Flowmeter for All Materials," Final Report under Grant DE-FG05-92ER81353, USDOE Oak Ridge Field Office, Nov. 15, 1999; (5) (same author as (3), "Electromagnetic Flowmeter for All Fluids", Proc Emerging Technologies Conference 2001, 10–13 Sep. 2001, Houston Tex., ISA Volume 415; (6). (same author as (3), "Electromagnetic Flowmeter for Insulating Liquids," IEEE Proc Instrumentation and Measurement Technology Conference, 21–23 May 2002, Anchorage Ak.). The metered fluid passes on the interior of a dielectric liner. The sensing and common electrodes are emplaced on the outside surface of the liner. Each electrode is curvilinear, matching the liner's contour; the sensing electrode is of length L. They are wide area electrodes, to provide adequate capacitive coupling (through the liner) to the flow generated voltage. The sensing electrode manifold is guarded on all sides, except through the liner to the metered fluid.

The above-cited references also detail magnet design and magnet drive circuitry; and describe preamplifier circuitry that enables the EM flowmeter to operate optionally as a volumetric flowmeter (for any liquid) or as a mass flowmeter for most insulating liquids.

To minimize high frequency eddy current losses in the several conductive electrode and guard sheets, all sheets are a combination of lower conductivity material superposed with high conductivity stripes, as shown in FIG. 2.

The dielectric liner attenuates (depending on liner thickness) the flow signal. The attenuation factor is computed based on auxiliary, continuous measurement of full-pipe direct capacitance between sensing electrode and common manifolds (see cited reference 3). Initial work was conducted without a liner; but later testing recommended it. Theoretical expressions are simpler without a liner; for simplicity here we omit its consideration.

For a linerless, single-sided (ie, non-balanced) preamplifier input, FIG. 3 shows the EM flowmeter's:

(1) equivalent circuit; and (2) block diagram of the preamplifier.

The cited references describe:

(1) $C_G$, the direct capacitance between sensing electrode and guard;

(2) $C_0$, the empty-pipe direct capacitance between sensing electrode and common;

(3) $R_0$, the flowmeter's internal resistance; and, (4) $V_F$, the flow-induced voltage.

The references further provide, $$C_0=2LK_0T/\pi, \tag{1}$$

$$V_F=v_m\pi aB\sin(\theta)/T, \tag{2}$$

where L=length of sensing electrode; $K_0$ is the permittivity of free space (8.85 pF/m); T=$\log_e[\sec(\theta)+\tan(\theta)]$; 2θ is the angle subtended by the sensing electrode; a is the pipe radius; B is the induction; $v_m$ is the mean flow velocity in the circular pipe. $R_0$ and $C_0$ are related by the metered fluid's relaxation time constant $\tau_F$ $$\tau_F=K_FK_0/\sigma_F=K_FC_0R_0, \tag{3}$$

where $K_F$ is the dielectric constant, and $\sigma_F$ is the electrical conductivity.

The transducer has an inherent shunting capacitance $C_0$, which occasions current loss $i_0$. The attendant preamplifier provides regenerative feedback to neutralize this loss, as shown in FIG. 3.

FIG. 4 shows Hentschel's measurement of triboelectric noise ((7) Hentschel, Rainer, "Über Induktive Durchflussmessung Mischleitender und Isolierender Flüssigkeiten," Doktor-Ingenieur dissertation, Technical University at Hanover (1973)). The noise is a statistical time series, the voltage continuous in time, and has a spectrum of about $f^{-2.6}$. When voltage samples are taken Δt apart, the difference ΔV in noise voltage is small if Δt is small; and ΔV approaches zero as Δt approaches zero. However, at any time t the noise voltage may be sizeable. We see the need to take voltage samples a small Δt apart, and form their differences.

SUMMARY OF THE INVENTION

It is an object of the invention to attain an electromagnetic flowmeter for measuring the flow of any material, regardless of its electrical properties.

The invention exploits that triboelectric noise, peculiar to turbulently flowing dielectric liquids, is a statistical time series, and it is advantageous to take data samples at small intervals Δt. Prior art took data samples at large Δt and was unable to discriminate among sensed total voltage components: (1) flow, (2) zero-point offset, and (3) triboelectric noise.

Instead of measuring total voltage, the invention senses total voltage differentials, which have small triboelectric noise, smooths the differentials, then integrates (sums) them such that the three components of total voltage are articulated—and, importantly, the flow voltage component itself is measured.

BRIEF DESCRIPTION OF THE DRAWINGS

The invention will be more clearly understood from the following description in conjunction with the accompanying drawings, wherein.

DETAILED DESCRIPTION OF THE INVENTION

Figure 1:
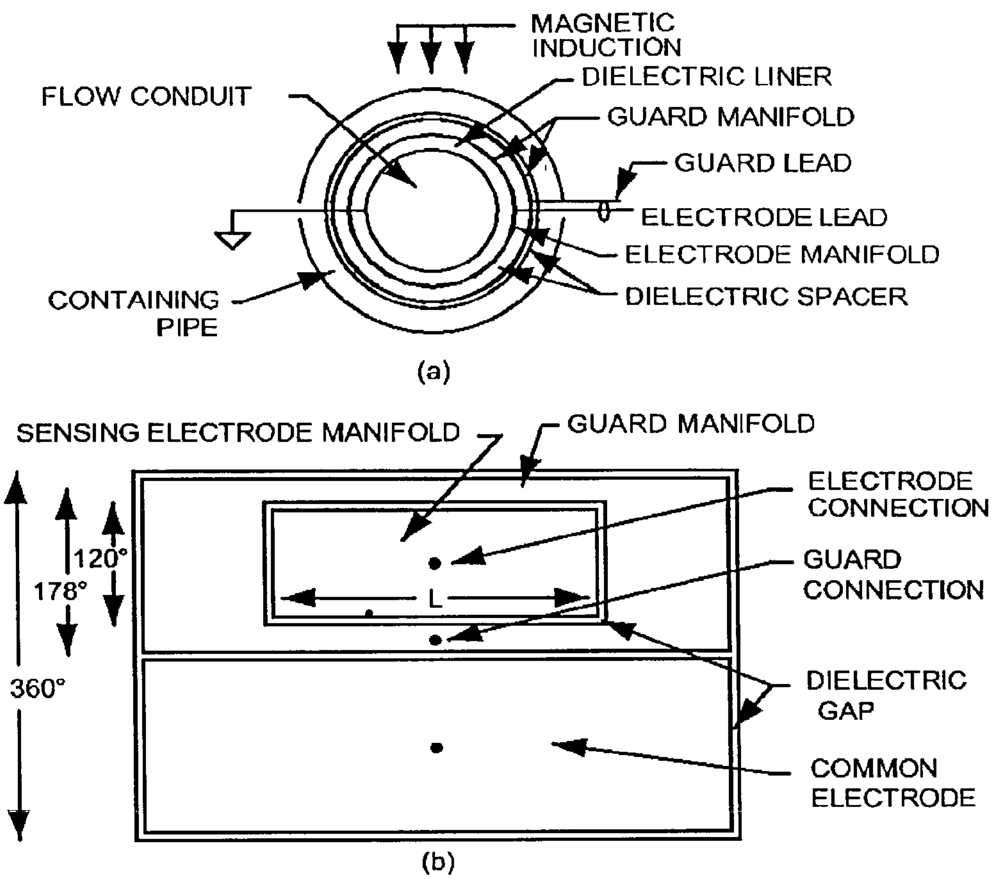
FIG. 1 illustrates a standard design for an EM flowmeter with fully a guarded wide-area, capacitance type electrode. An analogous design has been used in a balanced configuration. The simpler single-sided configuration is shown here. The dielectric liner shown is optional, and recommended.
Figure 2:
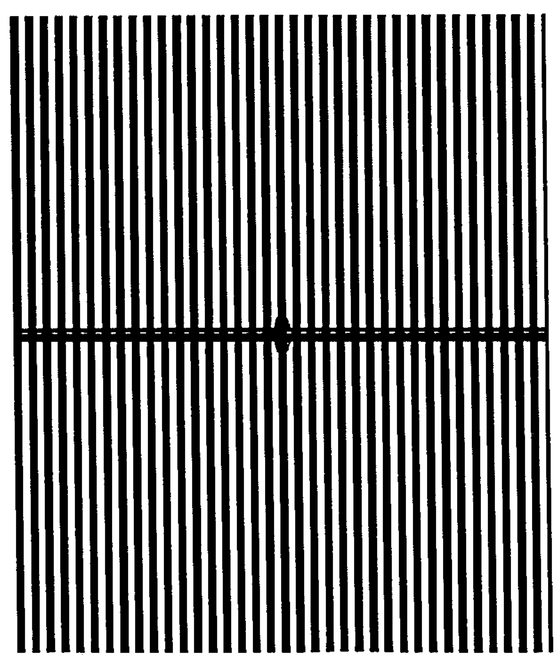
FIG. 2 illustrates a low eddy current conductive sheet for use as electrodes and guards in the rapidly alternating magnetic induction. It consists of photo-etched plastic sheet having highly conductive stripes. In practice a low conductivity paint (e.g., carbon paint) is superposed. In early practice the highly conductive stripes were silver paint, brushed on by hand. We show here a single layer; multi layers may be used (preferably with stripes staggered layer by layer) for increased shielding in the guard.
Figure 3:
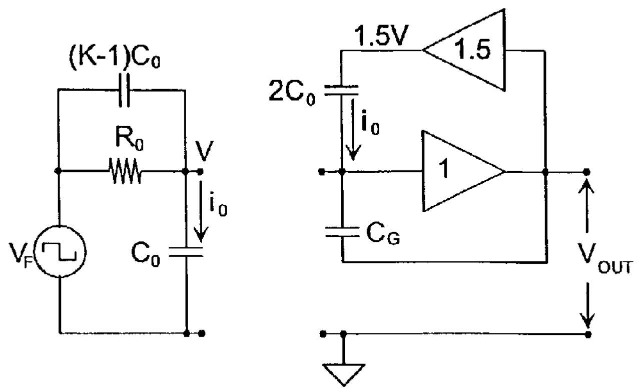
FIG. 3 illustrates the equivalent circuit for the EM flowmeter. The attached preamplifier neutralizes current loss $i_o$, and also serve as an impedance changer, providing low impedance output to the signal processor.

Let us define a dielectric EM flowmeter (DEMF) as one that employs prior art in its transducer design and in its preamplifier—e.g., as described in FIGS. 1 and 3. FIG. 3 shows that the attendant preamplifier: (1) neutralizes the inherent current loss $i_0$; (2) is an impedance changer with high input impedance (so as not to load the very high internal impedance of the transducer) and low output impedance (to provide ample power for connected ordinary analogue and digital devices); (3) has massive feedback (unity gain), providing very large, linear dynamic range (to accommodate wide excursions in triboelectric noise voltage).

The DEMF of the 1960s used a 1 KHz square wave to ameliorate triboelectric noise, but the rapid alternation in induction didn't allow time for the zero-offset to fully decay. Even so, it worked almost good enough; in the mid 1960s laboratory tests with transformer oil showed a zero-point drift of about 6 five percent (cited reference 2).

Figure 5:
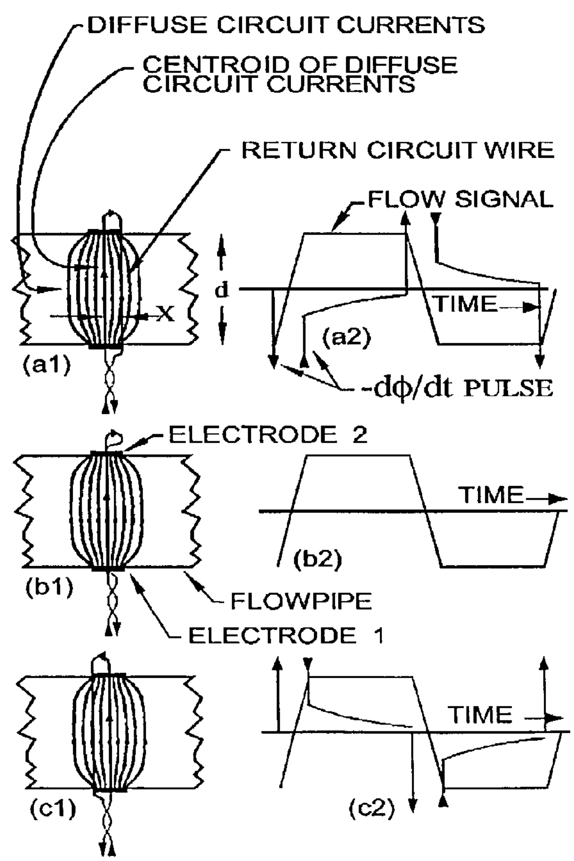
FIG. 5 illustrates that the magnitude and sign of dϕ/dt pulse aftereffect is proportional to the circuit loop's vector area: (a) positive, (b) zero, (c) negative.

The EM flowmeter is a circuit loop—partly hardwire, partly diffuse through the metered fluid, as shown in FIG. 5. A transformer effect is −dϕ/dt, where ϕ is the flux threading the loop—or −A·dB/dt, where B is the flux density (averaged over x) and A is the vector area of the threaded loop, as shown in FIG. 5(*a*1).

FIG. 5(*a*1) shows a positive loop area; the −dϕ/dt pulse has sign opposite to the flow, shown in FIG. 5(*a*2). The large ϕ-dot pulse at the start of each half cycle is owing to the changing large current in the magnet coil. The small, decaying ϕ-dot aftereffect for the remainder of each half cycle is owing to the decaying eddy currents in the magnet core.

FIG. 5(*c*1) shows a negative loop area; the −dϕ/dt pulse's sign is the same as that of the flow signal. It is theoretically possible to set up the circuit such that the net flux threading the loop is substantially zero, shown in FIG. 5(*b*)—eliminating the sensed −dϕ/dt pulse and its aftereffect. But it is difficult to cement the return circuit wire such that the loop area is precisely zero. More seriously, the loop's geometry changes with temperature, pressure, ageing, etc. The loop area cannot be stabilized at zero. The offset drifts.

B is proportional to the electromagnet winding's current. Its dϕ/dt pulse produces eddy currents, which prompt a secondary B, whose dϕ/dt produces secondary eddy currents, which prompt a tertiary B, and so forth. Further, dB/dt's decay character is not exactly constant as a function of the variable x shown in FIG. 5(*a*1). Hence, the aftereffect decay is substantially exponential, but not exactly.

Figure 6:
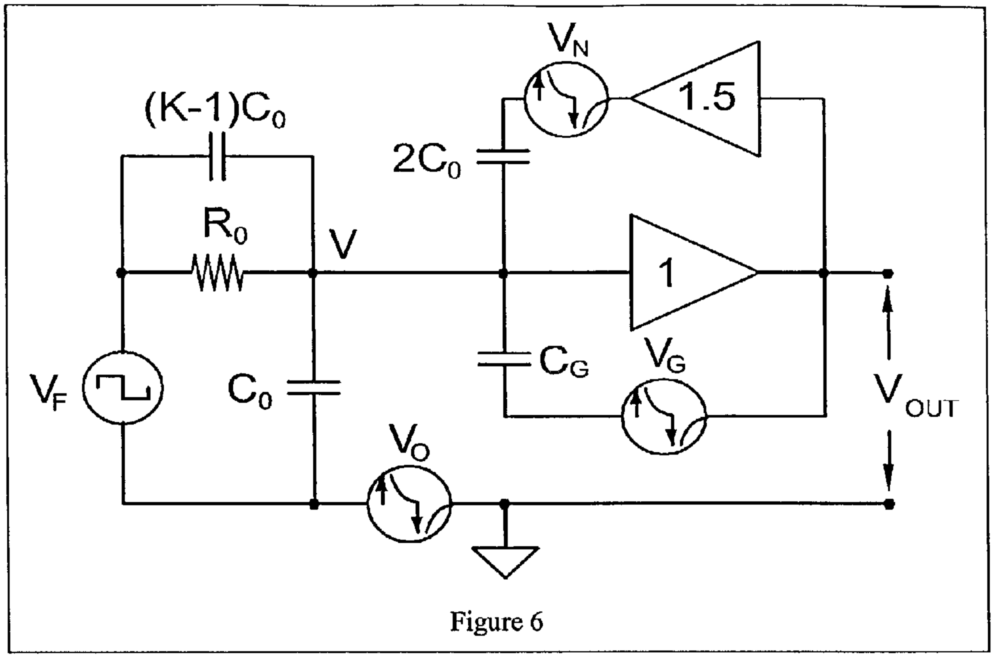
FIG. 6 illustrates FIG. 3's equivalent circuit, but adds the three aftereffect offset generators $V_0$, $V_N$ and $V_G$.

The dϕ/dt-decay offset generator of FIG. 5 is not the only one. Eddy currents elsewhere—cable shielding, amplifier shielding, overall flowmeter housing—produce aftereffect dϕ/dt voltages. FIG. 6 shows that there are three circuit loops—flowmeter loop F, neutralization loop N and guard loop G—with a node at the input of the preamplifier. Hence, there are three offset generators, $V_0$, $V_N$ and $V_G$.

The net offset voltage $V_T$ is $$V_T=[A_0V_0+A_NV_N+A_GV_G]/A_T \tag{4}$$

where $A_0$, $A_N$, $A_G$ are the admittances respectively around the Flowmeter-, Neutralization- and Guard-loops; $V_0$, $V_N$, $V_G$ are respectively the offset voltages around the same loops; and, $A_T$ is the admittance-to-common in this guarded and neutralized circuit:

$$A_T=1/R_0+i\omega(K-1)C_0 \tag{5}$$

for sinusoidal voltages, and generally $$A_T=1/R_0+s(K-1)C_0 \tag{6}$$

where s is the variable of the Laplace transform.

For conductive flowmeters, the admittance $A_0$ (around the flowmeter loop) is by far the largest—rendering $V_N$ and $V_G$ ineffective. With insulating liquids the admittance $A_G$ is much larger than either $A_N$ or $A_0$.

If the admittances of all three loops are purely capacitive, equation 6 simplifies to $$V_T=[KC_0V_O+2C_0V_N+C_GV_G]/[(K-1)C_0] \quad (7)$$

In laboratory tests $C_0$ measured about 0.5 pF; $C_G$ about 20 pF (see cited references 2,3). Since the flow loop and the contiguous guard loop are in the magnet's air gap, $V_G$ has substantially the same dϕ/dt time dependence as that shown in FIG. 5 for $V_0$. But with insulating liquids the coefficient of $V_G$ is about 40 times larger than the coefficient of $V_0$. It is important that we design such that $C_G$ and $V_G$ do not vary far from minimal.

Figure 4:
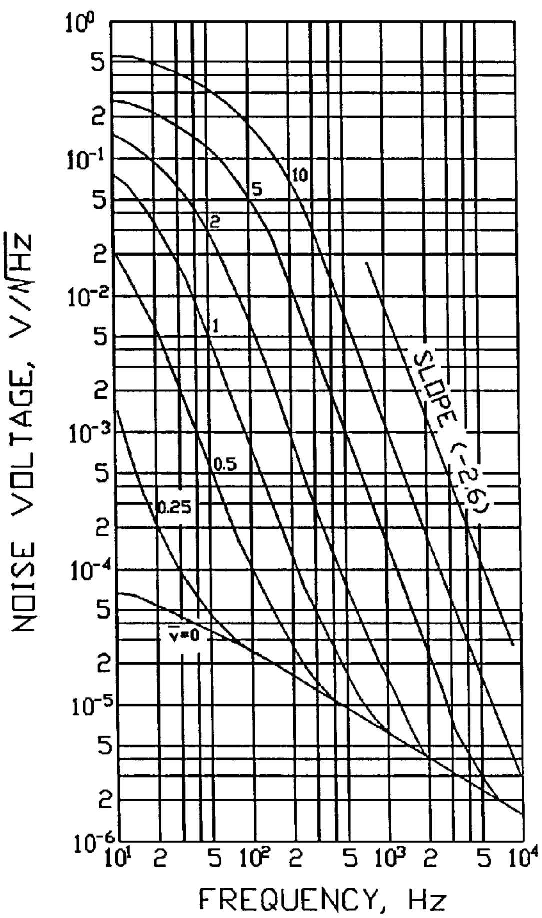
FIG. 4 illustrates Hentschel's measurement of triboelectric noise voltage in turbulently flowing transformer oil in 32 mm diameter flowmeter. Parameter is mean flow velocity in m/s.

The slow aftereffect decay is the reason commercially available EM flowmeters employ a low frequency induction, to allow full decay of the aftereffect. But triboelectric noise requires high frequency, as evidenced by FIG. 4: noise voltage is high at low frequency (sampling intervals that are long show a large noise voltage difference); noise voltage is low at high frequency (sampling intervals that are short show a noise voltage difference close to zero).

FIG. 5 shows that the flow signal (which is proportional to the induction B) changes linearly at the beginning of an induction half cycle, then is held constant—because the magnet's driving voltage is large at the beginning to accommodate current change in the inductance, then drops to a small voltage able to sustain the IR drop during the constant current, constant induction portion. The decaying dϕ/dt portion of the sensed voltage decays something like exponentially.

The invention is one of signal conditioning. A first way pursues the early DEMF methods of high frequency induction (HFI). A second way pursues the commercial flowmeter method of low frequency induction (LFI).

High Frequency Induction

The HFI method (HFIM) cannot wait for full decay of the aftereffect, so it estimates it by: (1) assuming an empirical function (having a constant term and also a portion which decays to zero) for the signal plus aftereffect; (2) collecting enough data so as to make a best fit of the data to the assumed function. For example, an appropriate assumed function might be $a+be^{-ct}$. During the positive induction phase a voltage sample $v_{n+}$ is measured; during the negative phase $v_{n-}$. The difference $v_n$ is formed. The $v_n$s are smoothed over many induction cycles so that we have $v_{ns}$. Smoothed values for several n are used to make a best fit to $a+be^{-ct}$. The constant portion is proportional to the steady (over each half cycle) flow voltage; b and c are measures of the spurious offset decay.

Figure 7:
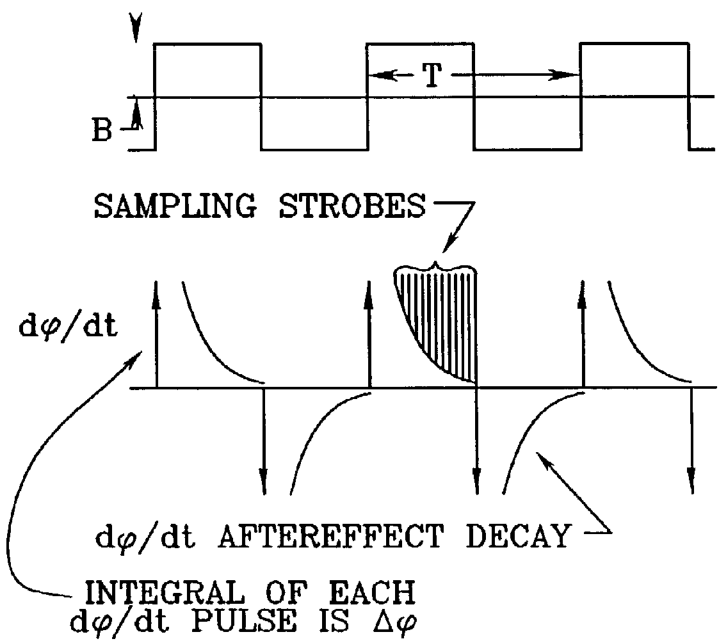
FIG. 7 illustrates an idealized square wave and the Dirac pulse producing them. Also illustrated are typical voltage sampling strobes, and the offset-producing dϕ/dt aftereffect decay.

The cited references describe practical square waves for induction. For simplicity here, FIG. 7 shows idealized square waves and the Dirac pulse dϕ/dt producing them. Also shown are typical voltage sampling strobes, and the offset-producing dϕ/dt aftereffect decay.

Low Frequency Induction

Figure 8:
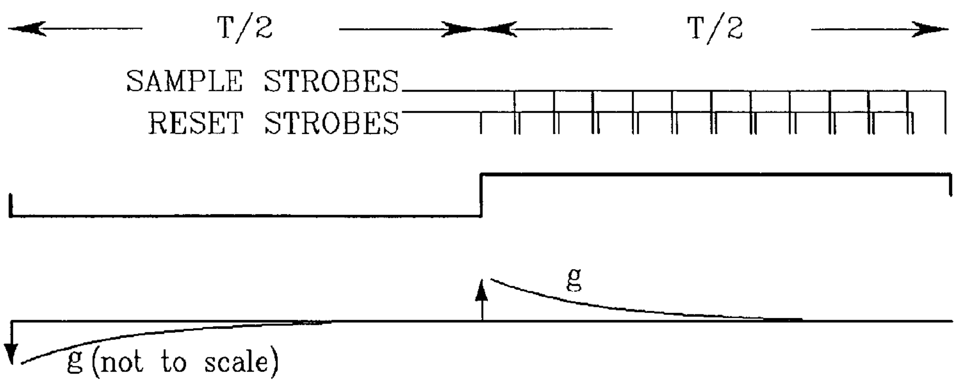
FIG. 8 illustrates a conventional low frequency square wave, such that the dϕ/dt aftereffect can fully decay, obviating the zero-point offset problem. Also displayed is the SAMPLE/RESET sequence to acquire differential measurement of the signal-and-offset function g(t).

FIG. 8 shows a conventional low frequency square wave, such that the dϕ/dt aftereffect can fully decay, obviating the zero-point offset problem. The remaining problem is how to accommodate the sizeable triboelectric noise voltage.

We learned that the voltage samples must be taken in very short intervals so that noise voltage differences are adequately small. In the Low Frequency Induction Method (LFIM) a sequence of RESET-then-SAMPLE (RTS) is used, as shown in FIG. 8. The first RESET occurs immediately prior to the magnet's phase-changing Dirac pulse. The first SAMPLE occurs preferably) after the magnet has completed its transition so that the signal processor need not contend with the very large dϕ/dt voltages during transition. Subsequent RTSs follow throughout the magnet's half cycle. This is tantamount to measuring not the total voltage (signal plus offset plus noise) but rather the differential of the total voltage. The sequence of RTSs provides a sequence of differences in g(t): $\Delta_1 g(t)$, $\Delta_2 g(t)$, . . . $\Delta_n g(t)$. One then constructs g(t) by first smoothing each $\Delta_n g(t)$ over several magnet cycles, and then summing (integrating) the smoothed $\Delta_n g(t)$.

The short time between each RESET and its HOLD measure differences in triboelectric noise appropriate to the short time. The shortness of interval is helpful: the autocorrelation function for the noise is bell-shaped, with zero slope when Δt (interval between samples) is zero, and is very close to zero for practical Δts. Hence, the noise component in each of the several $\Delta g_n$ samples is small—small enough to be smoothed adequately over reasonably short times (comparable to smoothing times employed in commercially available EM flowmeters).

General

Figure 9:
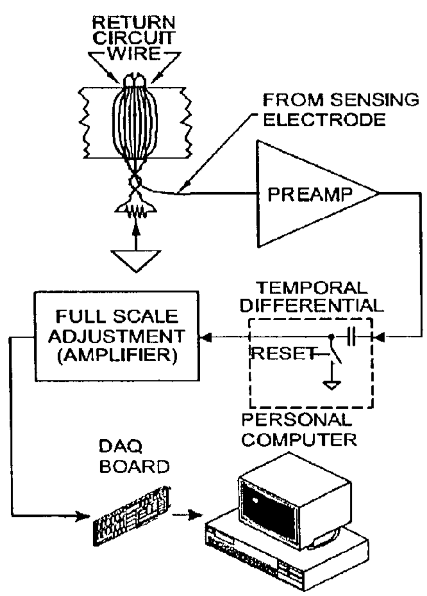
FIG. 9 illustrates block diagram of preamplifier and signal processor. By reference to FIG. 5, the potentiometer is an electrical method of changing the vector area. It can be automated to continually keep the effective area close to zero, with concomitant minimum dϕ/dt aftereffect offset

FIG. 9 is a block diagram of the preamplifier, attendant electronics and signal processing, as described in the cited reference 6. The (automated) potentiometer shown (an electrical offset nulling device, EOND) is an electrical means of minimizing the aftereffect voltage (cf FIG. 5), so that the dynamic range of the processor's A/D converter is reduced.

The output voltage of the preamplifier may be large, owing to triboelectric noise. The DEMF's preamp has wide dynamic range to accommodate this. But we prefer that the digital signal conditioning system not have to contend with this. The Temporal Differential module (TDM) accomplishes this with its RESET: its output's dynamic range is only owing to the voltage changes after RESET.

The TDM could well be incorporated into the preamp by providing for RESET of the preamp each half cycle. However, present state of the art (in amplifiers with exceedingly high input impedance) makes this chancy. The TDM RESET function could also be provided by the computer's DAQ module—but we prefer not to have the DAQ's A/D converter deal with the wide dynamic range at the output of the preamp.

The SAMPLE device is not shown explicitly. The DAQ board has many data channels, each with its SAMPLEr and A/D converter.

To reiterate, in HFI a data sample d+ is taken during the magnet's plus phase; d− at minus phase. Their difference d1 is immediately made. If the magnet alternates at 960 Hz ($16^{th}$ harmonic of power mains), for 16 magnet cycles (one power mains cycle) d1+d2+ . . . +d16 are averaged, to D1, to synchronously reject possible power mains noise. Then D1+D2+ . . . +DN are averaged for as many power mains cycles N as desired, to provide data smoothing for random noises.

If n data samples are taken each half cycle, the above process is conducted in parallel for all n samples, ultimately providing n smoothed data points, which are then used for data processing.

The DEMF is well suited for modern statistical signal processing methods: it has repetitious coherent flow and offset decay signals—in the face of substantial random noise. We here have used the rudimentary moving average to achieve adequate signal/noise ratio,

What is claimed is:

1. An electromagnetic flowmeter for measuring flow of a material, said flowmeter comprising:

a conduit of substantially insulative material for carrying said material;

a magnet for generating an alternating magnetic induction in a flow measurement region of said conduit;

at least two electrodes disposed on an outer surface of said conduit in said region; and a signal processing circuit for sampling and processing outputs from said electrodes, said signal processing circuit sampling at least one of said electrode outputs plural times during each half cycle of said alternating magnetic induction.

2. A flowmeter according to claim 1, wherein said signal processing circuit includes a compensation circuit for compensating for offsets.

3. A flowmeter according to claim 1, wherein said induction is an alternating induction, and the frequency of alternation is greater than a power mains frequency.

4. A flowmeter according to claim 3, wherein said frequency of alternation is a multiple of said power mains frequency.

5. A flowmeter according to claim 4, wherein said multiple is greater than 1.

6. A flowmeter according to claim 3, wherein said frequency of alternation is in the neighborhood of 1000 kHz.

7. A flowmeter according to claim 3, wherein said frequency of alternation is greater than 1000 kHz.

8. A flowmeter according to claim 1, wherein each of said electrodes is in the shape of a plate.

9. A flowmeter according to claim 8, wherein each said plate comprises an electrode grid.

10. A flowmeter according to claim 1, wherein said signal processing circuit further comprises an output sampling circuit for sampling a processed output of said electrodes, said signal processing circuit computing a plurality of difference signals by comparing pairs of time-offset samples.

11. A flowmeter according to claim 10, wherein said signal processing circuit comprises means for averaging a plurality of said difference signals.

12. A flowmeter according to claim 11, wherein said means for averaging includes means for averaging said difference signals over an integer number of cycles of a power mains frequency.

13. A flowmeter according to claim 1, wherein said signal processing circuit includes means for determining a voltage $V_f=V-V_d$, where $V_f$ represents measured flow, V represents a flow signal obtained from said electrodes and $V_d$ represents a spurious voltage.

14. A flowmeter according to claim 13, wherein $V_d=V_s e^{-t/\tau}$.

15. A flowmeter according to claim 1, wherein said signal processing circuit includes a preamplifier and a temporal differential module for resetting said preamplifier during each half cycle of said alternating magnetic induction.

16. A flowmeter according to claim 1, wherein said signal processing circuit includes a high frequency induction method circuit for estimating a signal by assuming a function describing said signal and collecting data from multiple cycles of said alternating magnetic induction so as to fit said data to said assumed function.

17. A flowmeter according to claim 1, wherein said signal processing circuit includes a low frequency induction method circuit for resetting at least a portion of said signal processing circuit multiple times during each half cycle of said alternating magnetic induction, and sampling said electrode outputs after each reset.

18. A flowmeter according to claim 1, wherein said signal processor circuit includes an excess noise indicator for indicating the presence of excess noise in a processed signal derived from said electrode outputs, and wherein said signal processing circuit is responsive to an indication of excessive noise to ignore said processed signal for multiple cycles of said alternating magnetic induction.

19. A flowmeter according to claim 1, wherein said signal processing circuit samples said at least one of said electrode outputs at least four times during each half cycle of said alternating magnetic induction.

* * * * *